United States Patent [19]
Niimi

[11] Patent Number: 5,744,889
[45] Date of Patent: Apr. 28, 1998

[54] ROTATING ELECTRIC MACHINE AND A STARTER HAVING THE SAME

[75] Inventor: Masami Niimi, Handa, Japan

[73] Assignee: Nippondenso Co., Ltd., Kariya, Japan

[21] Appl. No.: 670,666

[22] Filed: Jun. 26, 1996

[30] Foreign Application Priority Data

| Jun. 27, 1995 | [JP] | Japan | 7-160272 |
| Mar. 18, 1996 | [JP] | Japan | 8-060783 |

[51] Int. Cl.⁶ .................. H02K 13/00; H02K 1/00
[52] U.S. Cl. ................. 310/239; 310/64; 310/242
[58] Field of Search ......................... 310/239, 248, 310/242, 245, 43, 52, 64

[56] References Cited

U.S. PATENT DOCUMENTS

| 924,804 | 6/1909 | Lowendahl | 310/248 |
| 3,656,018 | 4/1972 | Maher | 310/242 |
| 4,355,253 | 10/1982 | Vollbrecht | 310/239 |
| 4,639,629 | 1/1987 | Casanova | 310/248 |
| 4,673,836 | 6/1987 | Akiyama et al. | 310/239 |
| 4,868,442 | 9/1989 | Isozumi et al. | 310/239 |
| 4,924,129 | 5/1990 | Copus | 310/239 |
| 4,926,078 | 5/1990 | Isozumi et al. | 310/71 |
| 5,508,577 | 4/1996 | Shiga et al. | 310/201 |
| 5,539,264 | 7/1996 | Kuragaki et al. | 310/239 |
| 5,608,280 | 3/1997 | Tamemoto et al. | 310/239 |

FOREIGN PATENT DOCUMENTS

| 2-046228 | 12/1990 | Japan . |
| 4-041748 | 9/1992 | Japan . |
| 5-211748 | 8/1993 | Japan . |

*Primary Examiner*—Steven L. Stephan
*Assistant Examiner*—Michael J. Wallace, Jr.
*Attorney, Agent, or Firm*—Cushman Darby & Cushman IP Group of Pillsbury Madison & Sutro LLP

[57] ABSTRACT

A commutator having a sliding surface formed by arranging a plurality of segments insulated with each other into a circle on a plane which is substantially perpendicular to a shaft is provided at one end of a armature. A plurality of brushes slide on the sliding surface. As seen from an axial direction, the brushes have a substantially trapezoidal shapes having widths that get narrower towards a center of the commutator. The brushes have a back end surface to which a spring is attached to. The back end surface is inclined towards the edge of the sliding surface of the commutator. The brush holders for receiving the brushes have recesses that are substantially trapezoidal in shape to correspond with the peripheries of the brushes.

27 Claims, 3 Drawing Sheets

ROTATING ELECTRIC MACHINE AND A STARTER HAVING THE SAME

CROSS REFERENCE TO RELATED APPLICATIONS

This application is based on and claims priority from Japanese Patent Application Nos. Hei-7-160272 and Hei-8-60783, the contents of which are incorporated herein by reference.

BACKGROUND OF THE INVENTION

1. Field of the Invention

The present invention relates to a rotating electric machine having a rotation shaft and a commutator whose sliding surface is substantially perpendicular with the rotation shaft and a starter which uses the rotating electric machine as a motor.

2. Description of Related Art

In recent years, there have been increasing needs for downsizing automotive starters because of lesser available space in the engine room due to an increase in the number of auxiliary parts and the like that goes with the trend for high-performance engines. Accordingly, reduction type starters which can be adapted to such needs are being used in increasing numbers. The reduction type starter has to inevitably rotate at a high speed when a reduction rate of reduction gears is increased to reduce motor size. Therefore, among commutators used in the motor, a surface type commutator having a sliding surface that is substantially perpendicular with the rotation shaft will be more durable and will be able to withstand high speed rotation better than a cylindrical commutator which has a plurality of commutator members (also called as segments) arranged to form a cylindrical shape and fixed by molding resin.

However, in a motor that uses the surface type commutator, since a size of a brush is determined by an external diameter of the commutator, the size of the brush will be inevitably reduced when the motor (armature) is downsized and the external diameter of the commutator is reduced. As a result, a contact area of the brush with respect to the sliding surface of the commutator is reduced and electric current density in the brush is increased, thus leading to an increase in the temperature of the brush. Excessive increases in the temperature of the brush leads to more brush wear and tear, thus shortening brush lifetime. Moreover, since the sliding surface of the commutator on which the brush slides on also overheats with the rise in temperature of the brush, surface condition of the sliding surface will deteriorate and sliding conditions of the brush worsen, and so, brush life is further shortened.

Meanwhile, Japanese Examined Utility Model Publication No. Hei 4-41748 discloses a direct current (DC) motor having a surface type commutator whose external diameter is larger than the diameter of the armature which is implemented by enhancing a centrifugal force resistance of the armature. According to this device, the external diameter of the surface type commutator will remain large in size even if the size of the armature is reduced. Therefore, brush size can remain as is without making the brush any smaller. However, in this case, the need to enhance the centrifugal force resistance strength of the commutator leads to increased manufacturing costs and so, downsizing the starter will not be an easy task.

Therefore, it is preferable to make the brush small while controlling the rise in temperature of the brush. However, since a large amount of electric current flows during a short period of time (which is usually about 30 seconds) in the electric motor used in the starter, cooling through forced cooling and the like will not be of much help. Thus, in order to control the rise in temperature of the brush while reducing the size of the brush to correspond to the downsized armature, brush heat should be dissipated efficiently through thermal conduction.

SUMMARY OF THE INVENTION

In view of the foregoing problems of the prior art in mind, the present invention aims to provide a rotating electric machine which reduces a rise in temperature of a brush by improving heat dissipation characteristics through thermal conduction. Also, it is another object of the present invention to provide a starter which is provided with such a rotating electric machine.

To achieve these aims, a first aspect of the present invention provides a rotating electric machine which includes an armature having a rotation shaft that extends along an axial direction thereof, a commutator having a sliding surface that is substantially perpendicular to the rotation shaft, a brush having a front end surface for sliding on the sliding surface of the commutator and a back end surface with the brush having a substantially trapezoidal cross-section such that the width of the brush gets narrower towards an axial center of the commutator and the back end surface being inclined towards the commutator, a biasing unit for biasing the brush in the axial direction from the back end surface of the brush towards the commutator, and a brush holder having high thermal conductivity and which includes a recess having a substantially trapezoidal shape for accommodating the brush in the recess and releasing heat received from the brush where the recess is shaped in accordance with the periphery of the brush.

In this way, since the back end surface of the brush is inclined towards the commutator, horizontal and vertical force components of a biasing force applied by the biasing unit act on the brush. The horizontal force component pushes the brush towards the sliding surface of the commutator. Also, the vertical force component pushes the brush towards the brush holder so that the brush is wedged tightly in the recess of the brush holder.

Another aspect of the present invention provides a rotating electric machine having a brush which has a substantially trapezoidal cross-section such that the width of the cross-section is smaller than a side length of the brush in a direction from the axial center of the commutator towards an edge of the sliding surface.

In this way, since the brush is shaped in the above-described manner, there is a large area of contact between the brush and the brush holder and thus, heat from the brush can be dissipated effectively.

An additional aspect of the present invention provides a rotating electric machine which includes an armature having a rotation shaft that extends along an axial direction thereof, a commutator having a sliding surface that is substantially perpendicular to the rotation shaft, a brush having a front end surface for sliding on the sliding surface of the commutator and a back end surface with the brush having a substantially trapezoidal cross-section and the back end surface being inclined towards the commutator, a biasing unit for biasing the brush towards the commutator, and a brush holder having high thermal conductivity and which includes a recess having a substantially trapezoidal shape for tightly holding the brush in the recess and releasing heat received from the brush with sides of the brush being in tight contact with recess that is shaped in accordance with a periphery of the brush.

In this way, because the brush is being tightly held in the recess of the brush holder, heat in the brush can be dissipated effectively through thermal conduction from the brush to the brush holder.

A further aspect of the present invention provides a rotating electric machine wherein the brush holder is further for accommodating a positive polarity brush in which the brush holder is made up of a material having high electric resistance and high thermal conductivity.

In this way, the heat of the brush can be dissipated effectively while keeping the brush electrically insulated from the brush holder itself.

Another aspect of the present invention provides a rotating electric machine wherein the brush holder is further for holding a positive polarity brush using a material having high electrical resistance and high thermal conductivity with the material being in contact with a separate material having excellent thermal conductivity.

In this way, there is no need to make the brush holder using materials of very high thermal conductivity and thus, manufacturing costs of the brush holder can be reduced.

A yet further aspect of the present invention provides a starter which includes a yoke having a fixed magnetic pole, an armature installed inside the yoke and which includes a rotation shaft that extends along an axial direction, an end frame for supporting an end of the rotation shaft, a pinion gear for transmitting a rotation of the rotation shaft to a ring gear of an engine, a commutator having a sliding surface which is substantially perpendicular to the rotation shaft, a brush having a front end surface for sliding on the sliding surface where the brush having a substantially trapezoidal cross-section in the axial direction such that its width gets narrower towards a center of the commutator, a biasing unit for biasing the brush towards the commutator, and a brush holder installed at the end frame, the brush holder having high thermal conductivity and including a recess for accommodating the brush pressed therein by the biasing unit and receiving and dissipating heat from the b rush.

In this way, because the biasing unit presses the brush towards the brush holder, heat from the brush can be dissipated effectively.

Another aspect of the present invention provides a starter which includes a reduction unit for reducing rotation speed of the rotation shaft and transmitting the rotation to the pinion gear.

In this way, when the armature is downsized using the reduction unit, heat from the brush can be dissipated to the brush holder.

A yet further aspect of the present invention provides a starter wherein the end frame is made up of a material having high thermal conductivity and the brush holder is attached to or formed integrally with the end frame.

In this way, heat can be dissipated more easily from the brush.

One other aspect of the present invention provides a starter wherein the brush as seen from the axial direction has a substantially trapezoidal cross-section such that the width of the cross-section is smaller than a side length of the brush in a direction from the center of the commutator towards an edge of the sliding surface, the brush holder has a recess for accommodating the brush, the recess has a substantially trapezoidal shape to accommodate the brush, and the biasing unit is for making at least two peripheral surfaces of the brush contact the recess of the brush holder.

In this way, with a larger area of contact between the brush and the brush holder, more heat from the brush can be dissipated to the brush holder.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

A rotating electric machine of the present invention is used as a DC motor in a starter.

Figure 3:
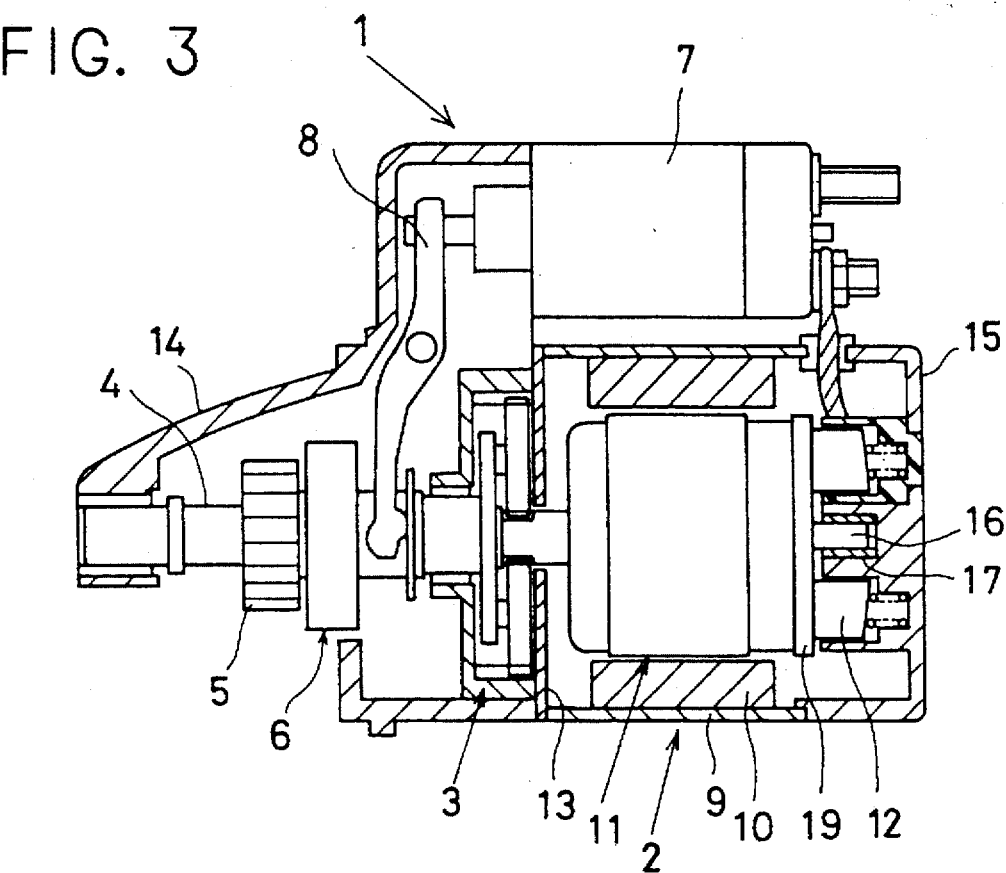
FIG. 3 is a cross-sectional side view of the starter.

As shown in FIG. 3, the starter 1 includes a motor 2 which generates a rotational force when actuated, a reduction gear 3 for reducing a rotational speed of the motor 2, an output shaft 4 for receiving the rotational force of the motor 2 via the reduction gear 3, a pinion gear 5 which fits onto the periphery of the output shaft 4, a one-way clutch 6 for transmitting the rotation of the output shaft 4 to the pinion gear 5, a magnet switch 7 for generating a pinion pressing force to the pinion gear 5 and opening and closing a motor circuit (not shown) and a lever 8 for transmitting the pinion pressing force of the magnet switch 7 to the one-way clutch 6.

The motor 2 includes a yoke 9, a fixed magnetic pole assembly 10, an armature 11 and a brush assembly 12.

The yoke 9 is formed in a cylindrical shape and is held between a front housing 14 and an end frame 15 together with a plate 13 which partitions the motor 2 and the reduction gear 3.

The fixed magnetic pole assembly 10 is made up of, for example, a plurality of permanent magnets and forms a magnetic field after being fixed inside the yoke 9.

Figure 1:
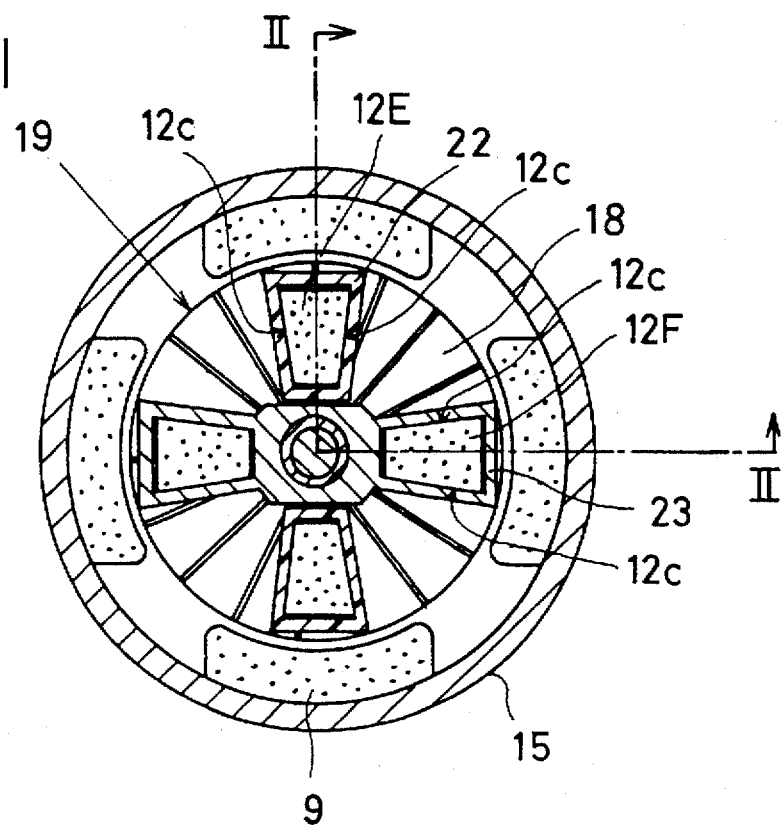
FIG. 1 is a cross-sectional view of a main portion of a starter as seen from an axial direction.
Figure 2:
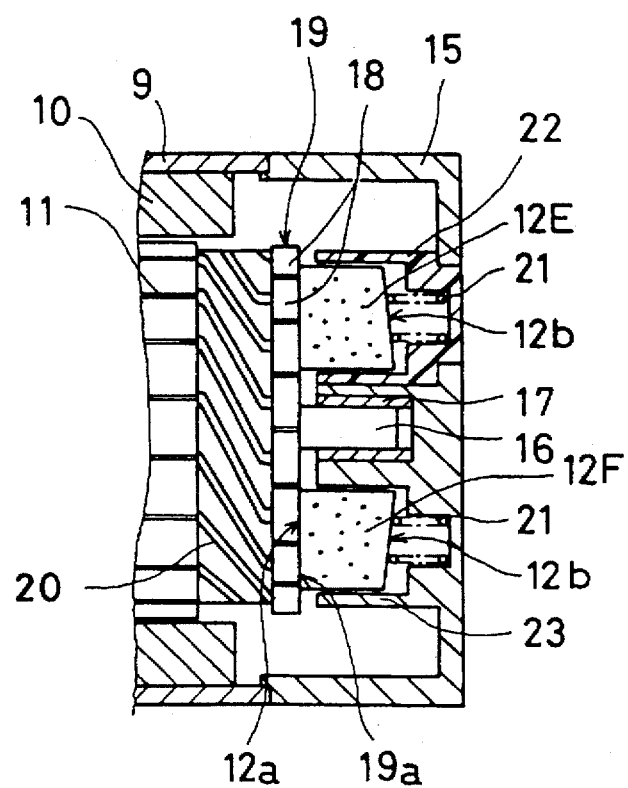
FIG. 2 is a side view of a II—II cross-section of a periphery of a brush of the starter according to a first embodiment of the present invention.

The armature 11 is supported in such a way that one end of its rotation shaft 16 (which serves as its axis of rotation) is supported via a bearing (not shown) by a recessed portion at a back end of the output shaft 4 with the other end of the same rotation shaft 16 being supported at the end frame 15 via a bearing 17. As shown in FIGS. 1 and 2, a commutator 19 having a sliding surface 19a formed by arranging a plurality of segments 18, which are insulated from one another, into a circle on a plane that is substantially perpendicular with the rotation shaft 16 is provided at one end of the armature 11. Each of the segments 18 is connected to each respective commutator coil 20 with each of the segments 18 being formed to have a substantially trapezoidal shape obtained by dividing a circle equally in a circumferential direction.

The brush assembly 12 includes a pair of positive electrode brushes 12E and a pair of negative electrode brushes 12F (hereinafter collectively referred to as electrode brushes 12E, 12F) which are held by springs 21 together with brush holders 22, 23. The springs 21, which are disposed in back end sides of the electrode brushes 12E, 12F, apply biasing forces on the back end surfaces 12b of the electrode brushes 12E, 12F so that front end surfaces 12a of the electrode brushes 12E, 12F slide on the sliding surface 19a of the commutator 19 at a proper load. As shown in FIG. 1, the electrode brushes 12E, 12F are disposed alternately in a circumferential direction to make contact with the sliding surface 19a of the commutator 19 at 900 intervals.

The electrode brushes 12E, 12F have peripheries that are shaped such that when seen from the axial direction correspond to the shapes of the segments 18 of the commutator 19. More concretely, as shown in FIG. 1, the electrode brushes 12E, 12F are substantially trapezoidal in cross-section such that their widths get narrower towards the center of the commutator 19. Furthermore, as shown in FIG. 2, the back end surfaces 12b of the electrode brushes 12E, 12F with which the springs 21 are in contact with are inclined towards the edges of the sliding surface 19a.

Figure 4A:
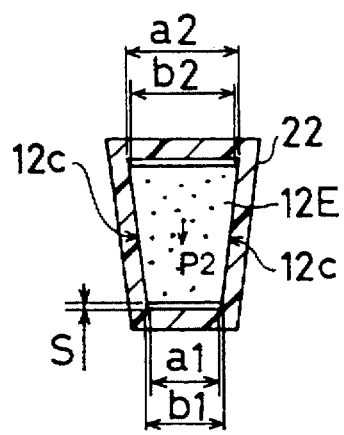
FIG. 4A is a cross-sectional view showing the brush and a brush holder according to the first embodiment.

The brush holders 22, 23 have recesses which are substantially trapezoidal in shape to correspond with the peripheries of the electrode brushes 12E, 12F to be accommodated within such recesses. As shown in FIG. 4A, it must be noted here that a width a1 of the recess of the brush holder 22 towards the center of the commutator 19 is a little narrower than a width b1 of the positive electrode brush 12E towards the center of the commutator 19, and a width a2 of the recess of the brush holder 22 towards the edge of the sliding surface 19a is a little wider than a width b2 of the positive electrode brush 12E towards the edge of the sliding surface 19a. That is, the sides of the recesses of the brush holders 22, 23 which are in contact with the side surfaces 12c of the electrode brushes 12E, 12F extend towards the center of the commutator 19 and the periphery of the sliding surface 19a to form a trapezoid. Although FIG. 4 illustrates a relation between the positive electrode brush 12E and the brush holder 22, the same relation also exists between the negative electrode brush 12F and the brush holder 23. The brush holder 22 for accommodating the positive electrode brush 12E is made up of an insulator and is fixed to the end frame 15. The brush holder 23 for accommodating negative electrode brush 12F is made up of a metallic material (for example, aluminum) and is formed integrally with the end frame 15.

Next, the operation of the present invention is explained with reference to FIG. 4.

Figure 4B:
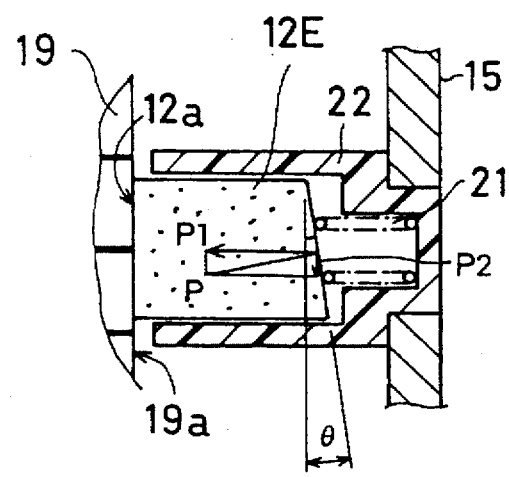
FIG. 4B is a cross-sectional side view of the brush according to the first embodiment.

Because the back end surfaces 12b of the electrode brushes 12E, 12F are inclined, vertical and horizontal components of the biasing force act on the electrode brushes 12E, 12F which are biased by the spring 21. That is, as shown in FIG. 4B, if P is the biasing force of the spring 21 and an angle between the back end surface 12b of the positive electrode brush 12E and the sliding surface 19a of the commutator 19 is θ, a horizontal force component P1 will be P1=P·cos θ and a vertical force component P2 will be P2=P·sin θ. The horizontal force component P1 acts in the axial direction to press the front end surface 12a of the positive electrode brush 12E towards the sliding surface 19a of the commutator 19. On the other hand, the vertical force component P2 acts in a direction along the sliding surface 19a to press the positive electrode brush 12E towards an axial center of the commutator 19. While explanations have been made here with regards only to the positive electrode brush 12E, the above also holds true for the negative electrode brush 12F.

The peripheries of the electrode brushes 12E, 12F as seen from the axial direction are substantially trapezoidal in shape with their widths getting narrower towards the axial center of the commutator 19 with the recesses of the brush holders 22, 23 being formed substantially in a trapezoidal shape to correspond with the shapes of the peripheries of the electrode brushes 12E, 12F. Therefore, as shown in FIG. 4A, the positive electrode brush 12E is pressed towards the narrower portion of the brush holder 22 towards the axial center of the commutator 19 by the vertical force component P2 of the biasing force P. The above also holds true for the negative electrode brush 12F.

The width a1 of the recesses of the brush holders 22, 23 is set to be narrower than the width b1 of the electrode brushes 12E, 12F in the side near the center of the commutator 19 so that the peripheral surfaces of the electrode brushes 12E, 12F are pressed to the recesses of the brush holders 22, 23 so that the electrode brushes 12E, 12F are not in contact with the narrow bottom portion of the recesses of the brush holders 22, 23 in the side near the axial center of the commutator 19. Therefore, a small clearance S is formed between the bottom portion of the electrode brushes 12E, 12F and the recesses of the brush holders 22, 23. That is, the electrode brushes 12E, 12F are inserted such that they are wedged into the recesses of the brush holders 22, 23 and held by the brush holders 22, 23 such that their side surfaces 12c are in contact firmly with the walls of the recesses of the brush holders 22, 23.

Because the electrode brushes 12E, 12F are held by the brush holders 22, 23 such that their side surfaces 12c are firmly in contact with the walls of the recesses of the brush holders 22, 23, an area of contact between the electrode brushes 12E, 12F and the brush holders 22, 23 can be increased. As shown in the following Eq. (1), an amount of heat conducted from the electrode brushes 12E, 12F to the brush holders 22, 23 increases with increase in the area of contact. Therefore, more heat is conducted from the electrode brushes 12E, 12F to the brush holders 22, 23 and the rise in temperature of the electrode brushes 12E, 12F can be reduced efficiently. Heat conducted to the brush holders 22, 23 is conducted to the end frame 15 which externally dissipates such heat.

$$Q = R \cdot S \tag{1}$$

In Eq. (1), Q is the amount of heat conducted from the electrode brushes 12E, 12F to the brush holders 22, 23, R is a thermal conductivity rate and S is the area of contact between the electrode brushes 12E, 12F and the brush holders 22, 23.

Meanwhile, both the side surfaces 12c (whose length are longer than the width of the cross-section in the axial direction of the electrode brushes 12E, 12F) of the electrode brushes 12E, 12F are wedged tightly in the recesses of the brush holders 22, 23 and the vertical force component P2 providing the force to enable such wedging is in a direction crossing the rotational direction of the commutator 19. Thus, the electrode brushes 12E, 12F will not shake along the direction of the sliding surface 19a even if a coefficient of friction between the sliding surface 19a of the commutator 19 and the front end surface 12a of the electrode brushes 12E, 12F fluctuates. Accordingly, the sliding characteristics of the electrode brushes 12E, 12F improve and the wear and tear of the electrode brushes 12E, 12F are reduced.

Furthermore, because the starter 1 is directly installed to the engine, it is of great help that shaking of the electrode brushes 12E, 12F is prevented efficiently especially for engines with large vibrations. That is, when the electrode brushes 12E, 12F shake, damages such as cracks in the corner portions of the electrode brushes 12E, 12F may occur. Thus, eliminating the shaking of the electrode brushes 12E, 12F as described above helps in preventing such damage.

Although the brush holder 22 for holding the positive electrode brush 12E needs to be made up of an insulator, the brush holder 22 can be made up of a material having high electrical resistance and high thermal conductivity, e.g., resin mixed with graphite, aluminum or the like and ceramic having high thermal conductivity, to effectively control the rise in the temperature of the positive electrode brush 12E. Moreover, the brush holder 23 for holding the negative electrode brush 12F is provided integrally with the metallic end frame 15 having excellent thermal conductivity so that the rise in temperature of the negative electrode brush 12F can be effectively reduced. It must be noted here that high electrical resistance refers to a level of low electrical conductivity at which a material effectively functions as an insulator. Also, it must be noted here that high thermal conductivity as used here and in the claims refers to a level of thermal conductivity for effectively controlling the rise in temperature of the electrode brushes 12E, 12F. Furthermore, excellent thermal conductivity refers to that level of thermal conductivity offered by metals and the like for effectively reducing the rise in the temperature of the electrode brushes 12E, 12F.

A second embodiment of the present invention is explained hereinafter.

Figure 5A:
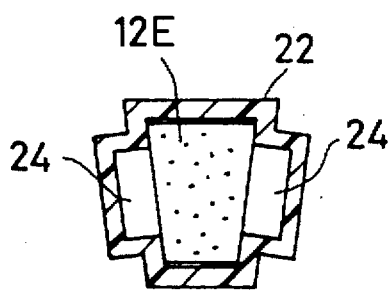
FIG. 5A is a cross-sectional view illustrating the brush and the brush holder according to a second embodiment of the present invention.
Figure 5B:
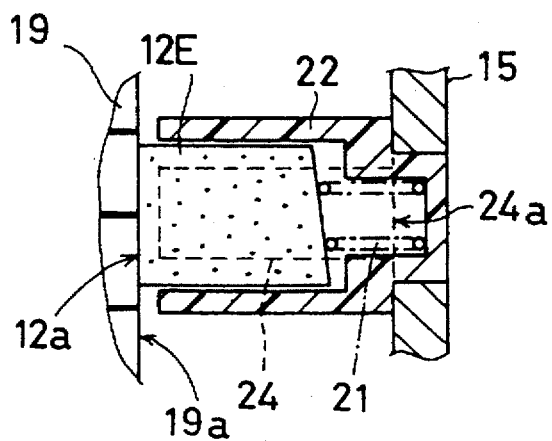
FIG. 5B is a cross-sectional side view of the brush according to the second embodiment.

As shown in FIG. 5A, in this second embodiment, a member 24 having high electrical resistance and high thermal conductivity which, for example, is made up of resin mixed with graphite, aluminum and the like, highly thermally conductive ceramic, etc. is provided inside the recess of the brush holder 22 beside the side surfaces 12c of the positive electrode brush 12E. As shown in FIG. 5B, an end surface 24a of the highly thermally conductive member 24 is in contact with an inner wall of the end frame 15. Therefore, the heat from the positive electrode brush 12E is conducted to the end frame 15 via the member 24 having high thermal conductivity and externally dissipated by the end frame 15. Since the brush holder 22 for holding the positive electrode brush 12E can be manufactured using inexpensive phenol molding material, manufacturing costs of the brush holder 22 can be reduced. Since the member 24 which has high electrical resistance and high thermal conductivity has a simple shape (it is shaped as a rectangle for the present embodiment), manufacturing costs can be reduced.

A third embodiment of the present invention is explained hereinafter.

Figure 6:
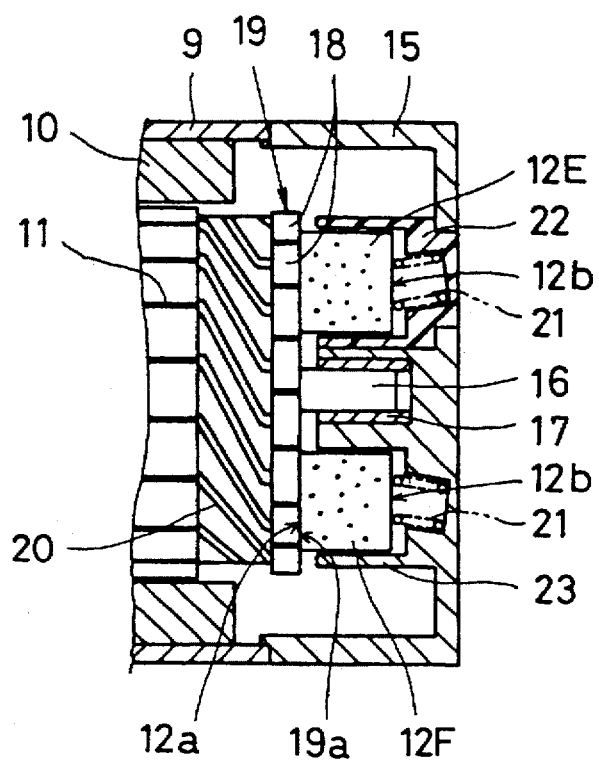
FIG. 6 is a fragmental cross-sectional side view of the starter with the brush according to a third embodiment of the present invention.

In this third embodiment, the electrode brushes 12E, 12F are shaped such that their back end surfaces 19b are substantially parallel to the front end surfaces 12a which are in contact with the sliding surface 19a of the commutator 19. Meanwhile, as shown in FIG. 6, the springs 21 for biasing the electrode brushes 12E, 12F held by the brush holders 22, 23 are inclined towards the center of the commutator 19. In more concrete terms, the springs 21 are inclined such a way that ends of the springs 21 which are connected to the back end surface 19b are more inclined towards the center of the commutator 19 as compared with the other ends which are being held by the brush holders 22, 23. In other words, the springs 21 are inclined in a direction to produce a force for pressing the back end surface 12b from the edge of the sliding surface 19a towards the center of the commutator 19.

In the same way as the first embodiment, the peripheries of the electrode brushes 12E, 12F as seen from the axial direction are substantially in trapezoidal in shape with their widths getting narrower towards the center of the commutator 19 with the recesses of the brush holders 22, 23 being formed in a substantially trapezoidal shape to correspond with the shape of the peripheries of the electrode brushes 12E, 12F.

Therefore, as shown also in FIG. 4A, since the electrode brushes 12E, 12F are wedged in the recesses of the brush holders 22, 23 by the above-described force, the side surfaces 12c of the electrode brushes 12E, 12F are held by the brush holders 22, 23 in tight contact with the walls of the recesses of the same brush holders 22, 23. As a result, since the contact area between the electrode brushes 12E, 12F and the brush holders 22, 23 increases, heat produced in the electrode brushes 12E, 12F can be conducted to the brush holders 22, 23 and thus, the rise in temperature of the electrode brushes 12E, 12F can be reduced efficiently. The heat conducted to the brush holders 22, 23 is conducted to the metallic end frame 15 and then externally dissipated by the end frame 15.

Meanwhile, it must be noted here that while the electrode brushes 12E, 12F have been formed to have straight peripheral sides as shown in FIGS. 1 and 2, the electrode brushes 12E, 12F may also be formed to have curved sides. In this case, the recesses of the brush holders 22, 23 may be shaped to correspond with the shapes of the peripheries of the electrode brushes 12E, 12F.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A rotating electric machine comprising:
   an armature which includes a rotation shaft that extends along an axial direction thereof;
   a commutator which includes a sliding surface that is substantially perpendicular to said rotation shaft;
   a brush having a front end surface for sliding on said sliding surface of said commutator and a back end surface, said brush having a substantially trapezoidal radial cross-section such that a width of said brush gets narrower towards a center axis of said commutator;
   a brush holder having thermal conductivity and which includes a recess for accommodating said brush and which is in thermal communication with side walls of said brush to dissipate heat from said brush, and
   single biasing means coupled to said back end surface of said brush, said biasing means being coupled with said back end surface to bias said brush towards said sliding surface of said commutator and to bias said brush towards said rotation shaft.

2. A rotating electric machine according to claim 1, wherein:

said back end surface of said brush inclines towards said sliding surface of said commutator; and said brush holder is for accommodating said brush in said recess such that surfaces of said side walls of said brush are wedged tightly in direct contact with walls of said recess.

3. A rotating electric machine according to claim 2, wherein:

said brush has said substantially trapezoidal radial cross-section towards said rotation shaft such that said width of its cross-section is smaller than the length of its side walls in a direction from said center of said commutator towards an edge of said sliding surface.

4. A rotating electric machine according to claim 1, wherein:

said brush is a positive polarity brush; and said brush holder is made up of a material having high electric resistance and high thermal conductivity.

5. A rotating electric machine according to claim 1, further comprising a thermally conductive member provided between said brush and said brush holder and which is in direct contact with said brush and said brush holder, wherein:

said brush is a positive polarity brush.

6. A rotating electric machine comprising:

an armature which includes a rotation shaft that extends along an axial direction thereof;

a commutator which includes a sliding surface that is substantially perpendicular to said rotation shaft;

a brush having a front end surface for sliding on said sliding surface of said commutator and a back end surface, said brush having a substantially trapezoidal radial cross-section such that a width of said cross-section gets narrower towards a center of said commutator;

a brush holder having thermal conductivity and which includes a recess for tightly holding said brush, walls of said recess being in thermal communication with side walls of said brush to dissipate heat from said brush; and biasing means coupled to said back end surface of said brush, said biasing means inclining with respect to said back end surface to bias said brush towards said sliding surface of said commutator and to bias said brush towards said rotation shaft to thereby tightly wedge said brush within said recess of said brush holder.

7. A rotating electric machine according to claim 6, wherein:

said biasing means is coupled to a back inner wall of said brush holder;

said back inner wall of said brush holder faces said back end surface of said brush and inclines with respect to said back end surface of said brush to incline said biasing means with respect to said back end surface of said brush; and said brush has said substantially trapezoidal radial cross-section such that said width of its cross-section is smaller than the length of its side walls in a direction from said center of said commutator towards an edge of said sliding surface.

8. A rotating electric machine according to claim 6, wherein:

said brush is a positive polarity brush; and said brush holder is made up of a material having high electric resistance and high thermal conductivity.

9. A rotating electric machine according to claim 6, further comprising a thermally conductive member provided between said brush and said brush holder and which is in direct contact with said brush and said brush holder; wherein:

said brush is a positive polarity brush.

10. A starter comprising:

a yoke having a fixed magnetic pole;

an armature installed inside said yoke, said armature including a rotation shaft that extends along an axial direction;

an end frame for supporting an end of said rotation shaft;

a pinion gear for transmitting a rotation of said rotation shaft to a ring ear of an engine;

a commutator having a sliding surface, said sliding surface being substantially perpendicular to said rotation shaft;

a brush having a front end surface for sliding on said sliding surface and a back end surface, said brush having a substantially trapezoidal radial cross-section such that its width gets narrower towards a center of said commutator;

a brush holder installed at said end frame, said brush holder having thermal conductivity and including a recess for accommodating said brush and for dissipating heat from said brush; and biasing means coupled to said back end surface of said brush, said biasing means being coupled with said back end surface to bias said brush towards said sliding surface of said commutator and to bias said brush towards said rotation shaft to thereby tightly wedge said brush within said recess of said brush holder.

11. A starter according to claim 10, said starter additionally comprising:

reduction means for reducing rotation speed of said rotation shaft and transmitting said rotation to said pinion gear.

12. A starter according to claim 10, wherein:

said end frame is made up of a material having high thermal conductivity; and said brush holder is formed integrally with said end frame.

13. A starter according to claim 10, wherein:

said end frame is made up of a material having high thermal conductivity; and said brush holder is attached to said end frame.

14. A starter according to claim 10, wherein:

said brush has said substantially trapezoidal radial cross-section such that said width of said cross-section is smaller than the length of its side wall in a direction from said center of said commutator towards an edge of said sliding surface, said recess of said brush holder has a substantially trapezoidal shape, and said biasing means for wedging said brush in said recess by making at least two peripheral surfaces of said brush contact said recess of said brush holder.

15. A starter according to claim 10, wherein:

said brush holder is for accommodating said brush in said recess such that side walls of said brush in a direction towards said center of said commutator are in tight contact with walls of said recess.

16. A rotating electric machine comprising:

an armature which includes a rotation shaft that extends along an axial direction thereof;

a commutator which includes a sliding surface that is substantially perpendicular to said rotation shaft;

a brush having a front end surface for sliding on said sliding surface of said commutator and a back end surface;

a brush holder having thermal conductivity and which includes a recess for holding said brush in said recess and for dissipating heat from said brush; and biasing means coupled to said back end surface of said brush, said biasing means being coupled to said back end surface to bias said brush towards said sliding surface of said commutator and to bias said brush towards said rotation shaft to thereby tightly wedge said brush within said recess of said brush holder, wherein said brush holder is further for accommodating said brush in said recess such that side walls of said brush are wedged tightly in said recess, and wherein said back end surface of said brush inclines towards said commutator so that said biasing means is pressing said brush into said recess of said brush holder to wedge said brush tightly in said recess.

17. A rotating electric machine according to claim 16, wherein:

said brush has a substantially trapezoidal radial cross-section such that a width of said cross-section gets narrower towards a center of said commutator, and such that said width of said cross-section is smaller than the length of a side wall of said brush in a direction from said center of said commutator towards an edge of said sliding surface.

18. A rotating electric machine according to claim 17, wherein:

said brush holder has said recess of a substantially trapezoidal shape to correspond with a shape of a periphery of said brush.

19. A rotating electric machine according to claim 1, wherein a narrowest portion of said recess of said brush holder is narrower than a narrowest portion of said brush so that there is a clearance between a bottom surface of said brush and a bottom side of said recess in a direction towards said center of said commutator.

20. A rotating electric machine according to claim 6, wherein a narrowest portion of said recess of said brush holder is narrower than a narrowest portion of said brush so that there is a clearance between a bottom surface of said brush and a bottom side of said recess in a direction towards said center of said commutator.

21. A rotating electric machine according to claim 6, wherein said brush holder is for accommodating said brush in said recess such that surfaces of said side walls of said brush are wedged tightly in direct contact with walls of said recess.

22. A starter according to claim 10, wherein said brush holder is for accommodating said brush in said recess such that surfaces of side walls of said brush are wedged tightly in direct contact with walls of said recess.

23. A starter according to claim 10, wherein a narrowest portion of said recess of said brush holder is narrower than a narrowest portion of said brush so that there is a clearance between a bottom surface of said brush and a bottom side of said recess in a direction towards said center of said commutator.

24. A rotating electric machine according to claim 16, said brush holder is for accommodating said brush in said recess such that surfaces of side walls of said brush are wedged tightly in direct contact with walls of said recess.

25. A rotating electric machine comprising:

an armature which includes a rotation shaft that extends along an axial direction thereof;

a commutator which includes a sliding surface that is substantially perpendicular to said rotation shaft, a brush having a front end surface for sliding on said sliding surface of said commutator and a back end surface;

a brush holder having thermal conductivity and which includes a recess for holding said brush in said recess and for dissipating heat from said brush; and biasing means coupled to said back end surface of said brush, said biasing means being coupled to said back end surface to bias said brush towards said sliding surface of said commutator and to bias said brush towards said rotation shaft to thereby tightly wedge said brush within said recess of said brush holder, wherein a narrowest portion of said recess of said brush holder is narrower than a narrowest portion of said brush so that there is a clearance between a bottom surface of said brush and a bottom side of said recess in a direction towards a center of said commutator.

26. A rotating electric machine according to claim 1, wherein said brush holder accommodates said brush within its recess such that there is a top clearance between a top side of said recess and a top part of said brush and there is a bottom clearance between a bottom side of said recess and a bottom part of said brush.

27. A rotating electric machine according to claim 1, wherein entire surfaces of said side walls of said brush are in tight contact with said walls of said recess of said brush holder in a radial direction towards said rotation shaft and in an axial direction towards said sliding surface of said commutator.

* * * * *